US012756226B2

(12) United States Patent
Holland et al.

(10) Patent No.: US 12,756,226 B2
(45) Date of Patent: Oct. 6, 2026

(54) ELECTRIC POWER SYSTEM CONTROL WITH PACKET STREAM REDUNDANCY AND CORRECTION

(71) Applicant: Schweitzer Engineering Laboratories, Inc., Pullman, WA (US)

(72) Inventors: Michael J. Holland, Garden City, ID (US); Phillip J. Stoaks, Caldwell, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 444 days.

(21) Appl. No.: 18/475,380

(22) Filed: Sep. 27, 2023

(65) Prior Publication Data

US 2024/0128792 A1 Apr. 18, 2024

Related U.S. Application Data

(60) Provisional application No. 63/378,959, filed on Oct. 10, 2022.

(51) Int. Cl.
*H02J 13/16* (2026.01)

(52) U.S. Cl.
CPC .................................... *H02J 13/16* (2026.01)

(58) Field of Classification Search
CPC ........... H02J 13/16; H02J 13/34; H02J 13/182
See application file for complete search history.

(56) References Cited

U.S. PATENT DOCUMENTS

| | | |
|---|---|---|
| 5,519,305 A | 5/1996 | Nomura |
| 7,078,825 B2 | 7/2006 | Ebrahim |
| 8,068,937 B2 | 11/2011 | Eaves |
| 8,275,488 B2 | 9/2012 | Kim |
| 8,338,971 B2 | 12/2012 | Radtke |
| 8,881,498 B2 | 11/2014 | Olia |
| 9,184,795 B2 | 11/2015 | Eaves |
| 9,248,826 B2 | 2/2016 | Hayashi |
| 9,574,511 B2 | 2/2017 | Kim |
| 9,753,096 B2 | 9/2017 | Kim |
| 9,853,689 B2 | 12/2017 | Eaves |
| 9,906,041 B2 | 2/2018 | Ravikumar |
| 9,912,158 B2 | 3/2018 | Ravikumar |
| 10,920,703 B1 | 2/2021 | Blood |
| 11,012,016 B2 | 5/2021 | Schweitzer |
| 11,035,891 B1 | 6/2021 | Schweitzer |

(Continued)

OTHER PUBLICATIONS

Elif Uysal-Biyikoglu, et al "Energy -Efficient Packet Transmission Over a Wireless Link", IEEE/ACM Transactions on Networking, vol. 10, No. 4, Aug. 2002.

(Continued)

*Primary Examiner* — Nicholas Klicos
(74) *Attorney, Agent, or Firm* — Richard M. Edge

(57) ABSTRACT

Electric power delivery system monitoring, control, and protection using a transmission of a first stream of power system information and a second stream of power system information, where the second stream is a lower-resolution cumulation of the information in the first stream is disclosed herein. The power system information may be in the form of energy packets. When a packet from the first stream is lost, the receiving device may use the second stream to calculate a value for the lost packet from the first stream. The calculated value of the lost packet may be used to correct or remediate for a protection or control operation that was previously determined.

13 Claims, 6 Drawing Sheets

(56) References Cited

U.S. PATENT DOCUMENTS

| | | | | |
|---|---|---|---|---|
| 11,467,197 | B2 | 10/2022 | Schweitzer | |
| 11,515,726 | B1 * | 11/2022 | Garner .................... | H02J 13/34 |
| 2003/0012147 | A1 * | 1/2003 | Buckman ............ | H04L 47/2416<br>370/352 |
| 2004/0008010 | A1 | 1/2004 | Ibrahim | |
| 2009/0198386 | A1 | 8/2009 | Kim | |
| 2009/0204268 | A1 | 8/2009 | Eaves | |
| 2010/0038907 | A1 | 2/2010 | Hunt | |
| 2010/0273429 | A1 | 10/2010 | Tiemeijer | |
| 2012/0059532 | A1 | 3/2012 | Reifenhauser | |
| 2012/0138582 | A1 | 6/2012 | Radtke | |
| 2014/0379191 | A1 | 12/2014 | Hayashi | |
| 2015/0039252 | A1 | 2/2015 | Kim | |
| 2015/0215001 | A1 | 7/2015 | Eaves | |
| 2016/0025023 | A1 | 1/2016 | Kim | |
| 2016/0134331 | A1 | 5/2016 | Eaves | |
| 2017/0271872 | A1 | 9/2017 | Ravikumar | |
| 2017/0271882 | A1 | 9/2017 | Ravikumar | |
| 2020/0111176 | A1 | 4/2020 | Schweitzer | |
| 2022/0322244 | A1 * | 10/2022 | Cheng ................... | H04W 40/10 |
| 2023/0268857 | A1 | 8/2023 | Schweitzer | |

OTHER PUBLICATIONS

Erol Gelenbe, et al "Central or Distributed Energy Storage for Processors with Energy Harvesting", 2015 Sustainable Internet and ICT for Sustainability (SustainIT), IEEE, Apr. 2015.

Erol Gelenbe and Elif Tugce Ceran "Energy Packet Networks with Energy Harvesting", IEEE Access, vol. 4, Mar. 2016.

A. Monti, et al "Towards a Real Digital Power System An Energy Packet Approach", 2017 IEEE Conference on Energy Internet and Energy System Integration (E12), Nov. 2017.

Roberto Rojas-Cessa, et al "An Energy Packet Switch for Digital Power Grids", 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 2018.

Ivan Smon, et al "Local Voltage-Stability Index Using Tellegen's Theorem", IEEE Transactions on Power Systems, vol. 21. No. 3, Aug. 2006.

Engineering Institute of Technology "Fundamentals of Smart Metering—kWh and kVArh Meters" Article [online]. Jul. 13, 2017 [retrieved Dec. 3, 2019]. Retrieved from <URL:https:www.eit.edu.au/cms/resources/technical-resourses/fundamentals-of-smater-metering-kwh-and-kvarh-meters-2>.

Schneider Electric "PowerLogic•™ PM5100 Series Power and Energy Meter" User Manual [online]. Mar. 2017 [retrieved Dec. 4, 2019]. Retrieved from <URL: https://download.schneider-electric.com/files?p_enDocType=User+guide&p_File_Name=EAV15105-EN05.pdf&p_Doc_Ref=EAV15105-EN>.

Yokogawa "How to Measure Electrical Power" Article [online]. 2017 [retrieved Dec. 4, 2019]. Retrieved from <URL:https://tmi.yokogawa.com/us/library/resources/application-notes/how-to-measure-electrical-power/>.

* cited by examiner

ELECTRIC POWER SYSTEM CONTROL WITH PACKET STREAM REDUNDANCY AND CORRECTION

RELATED APPLICATIONS

This application claims priority to U.S. Provisional Application Ser. No. 63/378,959, filed on 10 Oct. 2022, entitled "Remediation for Communication Errors Using Energy Packets" naming Michael Holland and Phil Stoaks as inventors, which is hereby incorporated by reference in its entirety for all purposes.

TECHNICAL FIELD

This disclosure relates to transmission of packetized electric power information at different resolutions for monitoring, control, and/or protection of electric power system equipment. More particularly, this disclosure relates to remediating missing packets in a higher resolution stream of packetized information using a lower resolution stream of packetized information for apparatus monitoring, control, and/or protection operations.

BRIEF DESCRIPTION OF THE DRAWINGS

This disclosure includes illustrative embodiments that are non-limiting and non-exhaustive. Reference is made to certain of such illustrative embodiments that are depicted in the figures described below.

DETAILED DESCRIPTION

Figure 1:
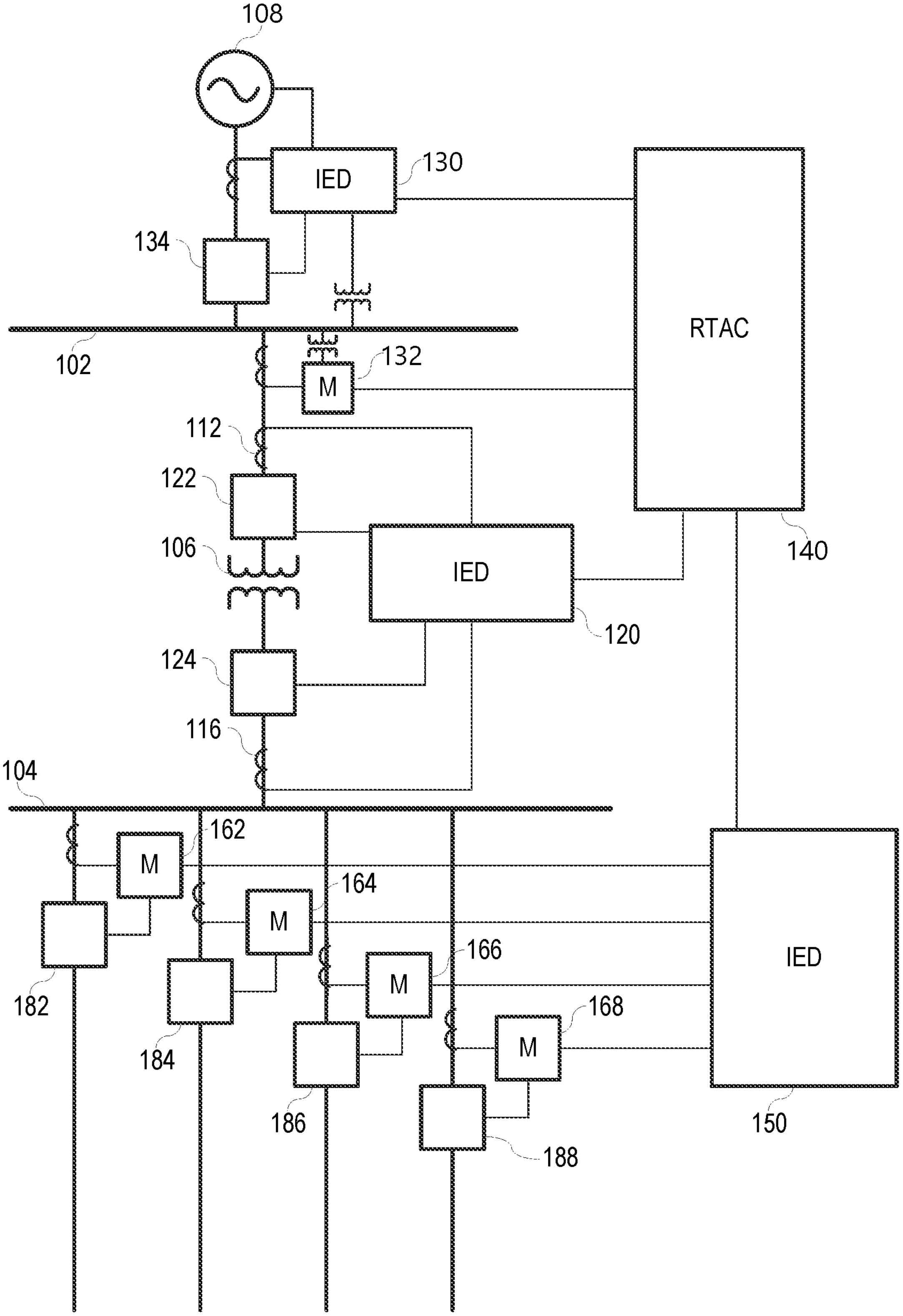
FIG. 1 illustrates a simplified one-line diagram of a power delivery system and associated power system devices.

Electric power delivery systems may be made up of a variety of electric power system apparatuses, and may be monitored and protected using power system devices that obtain measurements from the apparatuses and use the obtained measurements to determine apparatus status and apply monitoring, control, and/or protection operations depending on the status. The devices may operate individually and/or as a system. Depending on the power system, certain devices may be disposed on portions of the power system to gather measurements and transmit the measurements to other devices tasked with determining apparatus status and applying monitoring, control, and/or protection operations. Accordingly, the operations rely on communication of the obtained power system information.

Electric power system meters may be used at several locations to monitor electric power delivery systems. Electric power meters may be used to monitor various aspects of electric power such as, for example, energy, demand, power, current, voltage, frequency, load, waveform, flicker, voltage sag/swell/interruptions (VSSI), sequence of events, harmonics, and the like. Such data may be useful for revenue calculations, power quality analysis, protection settings, protective actions, system control, and/or historical data research. In various embodiments, meters may be used to obtain electric power system measurements and transmit the measurements to other devices for use in monitoring, control, and/or protection operations.

Another device that may be used to obtain and transmit electric power apparatus information is a merging unit. Various merging units are configured to be in electrical communication with a power system apparatus to obtain voltage signals, current signals, speed, temperature, and the like using instrument transformers such as potential transformers (PTs), current transformers (CTs), Rogowski coils, fiber-optic transformers, and the like. Merging units may be configured to obtain power system signals, digitize the signals, perform some signal processing, and transmit such information to one or more receiving devices.

Various communication methods may be available to transmit the power system information from a data acquisition device (such as a meter, merging unit, or the like) to a control device (such as an intelligent electronic device or "IED"). For various operations, a high-rate communication method may be preferred. That is, the data acquisition device may use a communication method that favors a higher number of transmissions per second. However, a high-rate communication method may not allow for receipt acknowledgements and retransmission of missed packets. Thus, a missing packet may result in an erroneous operation by the device. In various other operations, a low-rate communication method that does allow for receipt acknowledgement and retransmission of missing packets. However, the low-rate communication method may not be sufficiently responsive for the equipment attribute that is being monitored, controlled, and/or protected.

What is needed is a system to allow for responsive monitoring, control, and/or protection operations that use a high-rate communication method but also corrects for missing packets of information. The embodiments presented herein address this need.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are generally designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. Well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates a one-line diagram of an example of an electric power delivery system and associated IEDs for monitoring, control, and/or protection of the electric power delivery system. The electric power delivery system includes a generator 108 which may be used to provide power to bus 102. Transformer 106 may be used to provide electric power at an expected level to bus 104. A number of feeders may be in electrical communication with bus 104 to distribute electric power. Each feeder may be monitored by an IED such as the illustrated meters 162, 164, 166, 168. It should be appreciated that such IEDs may alternatively be in the form of protective relays (such as feeder protection relays), or merging units. The illustrated meters obtain currents from the feeders via CTs and may also obtain voltage from the bus 104 or from the feeders using PTs (not separately illustrated). The meters 162-168 may be configured to provide power system information to a protective device such as IED 150 for power system protection functions including, for example, signaling the circuit breakers 182, 184, 186, 188 to trip upon detection of an event. IED 150 may be configured to monitor for various power system events such as, for example, overcurrent, undervoltage, overfrequency, underfrequency, bus differential, and the like.

Transformer protection relay 120 may be an IED configured to provide protection to the transformer 106. IED 120 may obtain current signals from both sides of transformer 106 using CTs 112, 116 (or merging units, meters, or other devices obtaining such signals). IED 120 may further provide information to RTAC 140. IED 120 may be configured to provide differential protection, overcurrent protection, overfrequency protection, underfrequency protection, and other various protection for the transformer 106. Upon determination of an event, IED 120 may signal one or more circuit breakers 122, 124 to open to isolate the transformer 106 from the event.

IED 130 may be configured to monitor, control and/or protect generator 108 using current signals and/or voltage signals obtained from the primary equipment (or from meters or merging units obtaining such signals from the primary equipment). The IED 130 may obtain further mechanical and/or electrical information from the generator such as temperature, mechanical frequency (e.g. rotational frequency from a prime mover) or the like. IED 130 may further provide control to the generator by adjusting fuel reference control to the prime mover to modify the energy output of the generator. Upon detection of certain conditions, IED 130 may be configured to effect a protective action to isolate generator 108 from the power system by signaling circuit breaker 134 to open.

The system may include one or more meters to monitor portions of the power system. Meter 132 may obtain voltage signals from bus 102 and current to the transformer 106 using instrument transformers (or even from merging units). IEDs 162-168 may be implemented as meters. The meters may obtain signals from the electric power system, determine status, and transmit certain information based on obtained information. In various embodiments, meters may be used to transmit energy usage information, measurements, and the like.

IEDs may be configured to transmit power system information, control information, and protection information to controllers such as a real-time automation controller (RTAC)

140. The RTAC 140 may be configured to obtain information from numerous IEDs 120, 130, 132, 150 and use the information for monitoring, control, and protection operations, and transmit commands back to the IEDs 120, 130 based on the operations. In various embodiments, RTAC 140 may use information provided by IED 130 and meter 132 to determine generator control operations such as fuel references for the prime mover based on, for example, energy consumed as calculated by meter 132.

Figure 2:
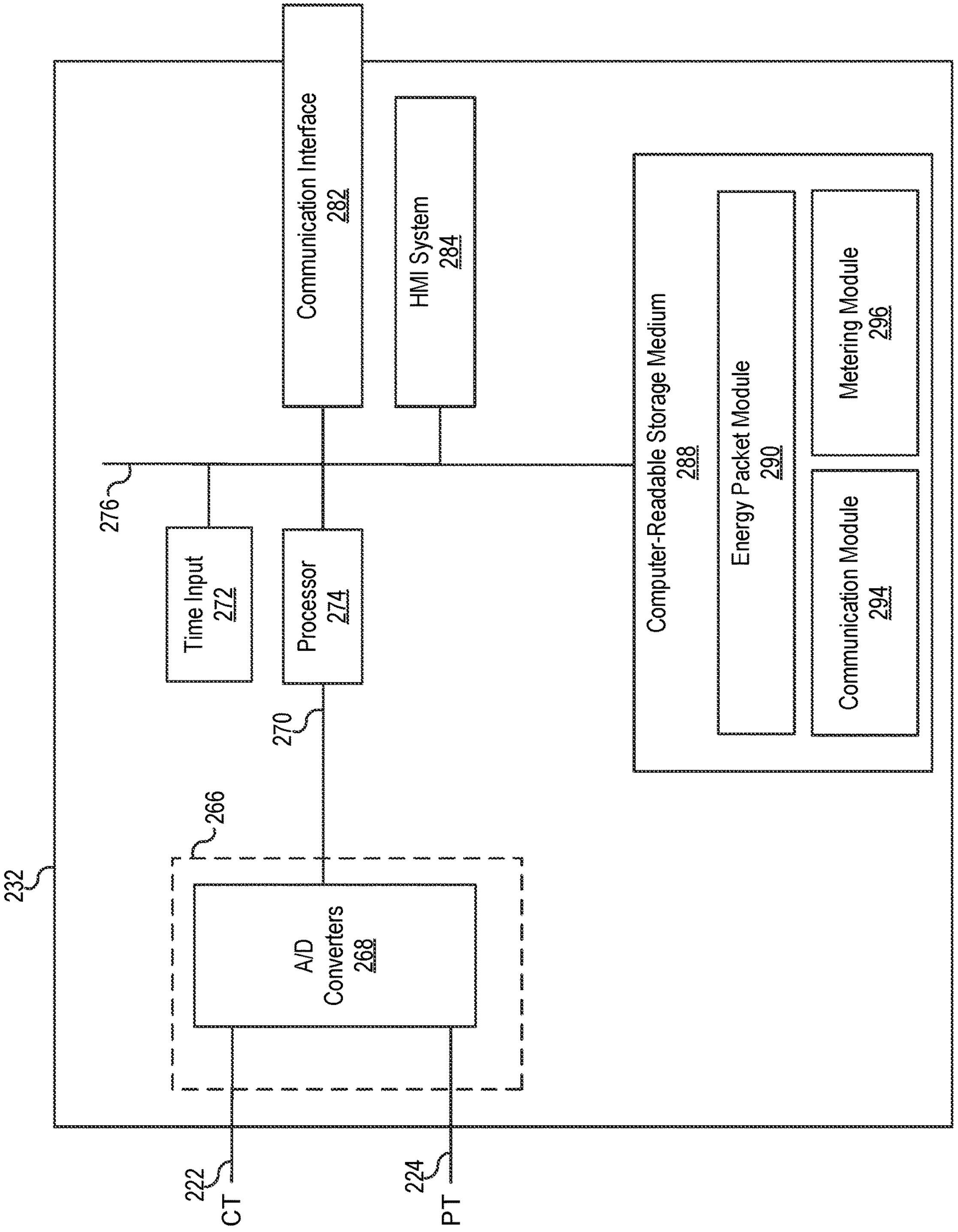
FIG. 2 illustrates a simplified block diagram of an energy packet device in accordance with several embodiments herein.

FIG. 2 illustrates a simplified functional block diagram of an IED 232 that may be used to obtain electric power system signals, provide monitoring, control, and/or protection operations, and transmit various information to consuming devices. IED 232 may be any IED that is implemented to obtain power system information, calculate energy packets, transmit information to consuming devices, and/or provide I signals to equipment. In various embodiments, IED 232 may be a protective relay, a merging unit, a meter, or the like. As illustrated, the IED 232 may include a signal input 266 for obtaining electric signals from the electric power delivery system either from primary equipment or from merging units. In the illustrated embodiment, current signals 222 may be obtained from an instrument transformer such as a CT; and voltage signals 224 may be obtained from an instrument transformer such as a PT. Various other equipment may be used to obtain currents and/or voltages. The current and voltage signals 222, 224 may be sampled and digitized by one or more analog-to-digital (A/D) converters 268. The signal input may include various other filters and the like to condition the signal for use by the protective functions. Although a single set of current and voltage signals are illustrated, the IED 232 may be configured to obtain multiple current signals and/or multiple voltage signals. Digitized signals 270 may be made available to processor 274. The processor 274 may be any device capable of receiving inputs, executing computer instructions, and transmitting communications. The processor 274 may be a microprocessor, field-programmable gate array (FPGA), application-specific integrated circuit (ASIC), or the like, and may be spread across multiple architectures, include computer memory, and so forth.

IED 232 may include various inputs and interfaces such as a time input 272 to obtain a common time signal from a common time source. The common time signal may be used in various protection and monitoring functions. A communications interface 282 may be provided to facilitate communications with SCADA, other IEDs, MUs, or the like. The IED 232 may include a monitored equipment interface for communication with monitored equipment such as circuit breakers, transformers, capacitor banks, voltage regulators, reclosers, MUs, or the like to send command signals to the equipment and/or receive status information from the equipment. A computer readable storage medium 288 may be a repository of computer instructions for execution on the processor 274. Although illustrated as a separate component, the storage medium 288 may be packaged with the processor 274. In various other embodiments, the processor may be embodied as a dedicated processing device such as a field-programmable gate array (FPGA) operating various protection instructions. A human-machine interface (HMI) system 284 may provide a display and include input hardware for accepting inputs from a user. Various components may be in communication via a communications bus 276.

The computer-readable storage medium 288 may include instructions for execution of various operations of the IED. For example, a module of communications instructions 294 may be executed by the processor such that the IED 232 performs communication functions with other devices. The communications instructions 294 may include instructions for formatting communications, receiving communications, addresses for communicating, settings related to compliance with IEC 61850 communications standards, and the like. As will be described in more detail herein, the communications module 294 may be configured to transmit energy packets from the energy packet module 290 at a variety of rates and/or resolutions.

A metering module 296 may include computer instructions related to metering of primary equipment. Metering instructions may include instructions for performing various metering functions such as quantifying and/or calculations of current, voltage, phasors, power, frequency, KYZ pulses, volt-ampere reactive (VARs), apparent power, symmetrical components, and the like, as well as instructions for formatting such calculations for communication and display.

An energy packet module 290 may be provided for calculating energy packets and providing energy packets in various resolutions for monitoring the electric power system and communication to other devices for monitoring, control, and/or protection of the electric power delivery system. Energy packets may be made available to the metering module 296 for metering operations of the IED 232. Energy packets may be made available at various resolutions or rates to communications module 294 for communication to consuming devices.

Energy packets may be used in various electric power system monitoring, control, and/or protection applications that use energy as a quantity of interest. Energy packets are a technique to measure energy entering or leaving a system over fixed small intervals of time. The summation of this energy over a specific process is known as work. Power is defined as the rate of work or energy changes per unit time. The phrase "energy packet" is therefore used to distinguish the energy packet measurement, the energy transferred during each of these fixed, small, time intervals, from the more general term "work," Given a sufficiently small time interval, an individual energy packet would be proportional to the sampled value of instantaneous power at that moment.

A control system using energy packet measurements can quickly respond to load changes. As an example, consider an embodiment of a control system that measures energy packets every T seconds, where T could be 1 to 100 milliseconds. Consider a source, whether a machine, a solar panel, or a windmill, that is providing work at a certain rate (power) into the power system. When a breaker trips or there's a fault, the power flow out of the source (Pm) drops. The machine experiences the change in the rate of energy as soon as the fault occurs. The rate of change of energy can be measured by the control system with energy packets.

The energy packet module 290 may be configured to calculate energy packets, such as discrete time energy packets illustrated and described below. Energy packets capture the full spectrum of the signal and are applicable for both sinusoidal steady-state and nonstationary conditions. Over each time interval, the energy packet calculator 290 may compute the energy from measurements of voltage and current. The fixed interval does not depend on any estimated power system quantity such as fundamental frequency. In this way, an energy packet is a time-domain concept. The energy packet calculator 290 may calculate energy packets flowing past the IED 232 using principles detailed below.

Equation 1 defines the continuous-time energy packet $\varepsilon(t)$ from voltages $v(\sigma)$ and currents $i(\sigma)$:

$$\varepsilon(t) = \int_{t-T}^{t} v(\sigma)i(\sigma)d\sigma \quad \text{Eq. 1}$$

Equation 2 defines the three-phase energy packet $\varepsilon_3(t)$. In Equation 8, the integration interval is over the same time interval for all three phases. This equation includes the possibility of unbalanced three-phase operation.

$$\varepsilon_3(t) = \int_{t-T}^{t} [v_{a\text{-}phase}(\sigma)i_{a\text{-}phase}(\sigma) + v_{b\text{-}phase}(\sigma)i_{b\text{-}phase}(\sigma) + v_{c\text{-}phase}(\sigma)i_{c\text{-}phase}(\sigma)]d\sigma \quad \text{Eq. 2}$$

Equation 3 defines the discrete-time energy packet ε[n], where it is appreciated that the product of the voltage (e.g., in J/c) and current (e.g., in c/s) is power (e.g., in J/s). The value $T_S$ is the data sample period, and M represents to factor for down sampling:

$$\varepsilon[n] = T_s \sum_{m=M(n-1)+1}^{Mn} v[m]i[m] \quad \text{Eq. 3}$$

where:

- $\varepsilon^+[n]$ represents the positive energy packet value for sample n;
- $\varepsilon^-[n]$ represents the negative energy packet value for sample n;
- $T_S$ represents the data sample period;
- M represents a factor for downsampling;
- v[m] represents a voltage value at sample m; and,
- i[m] represents a current value at sample m.

The notation for a discrete-time quantity is with hard brackets: $v[m] \equiv v(mT_S)$. Equations 1-3 place no constraint on the values of T or $T_S$. Thus, energy packets are frequency independent.

In some embodiments, the system uses the three-phase equation. In one embodiment, the system uses the three-phase equation directly. In another embodiment, the system filters to remove noise or energy oscillations due to unbalanced conditions. In another embodiment, the system uses the Clarke transformation of the three-phase energy packet.

Figure 3:
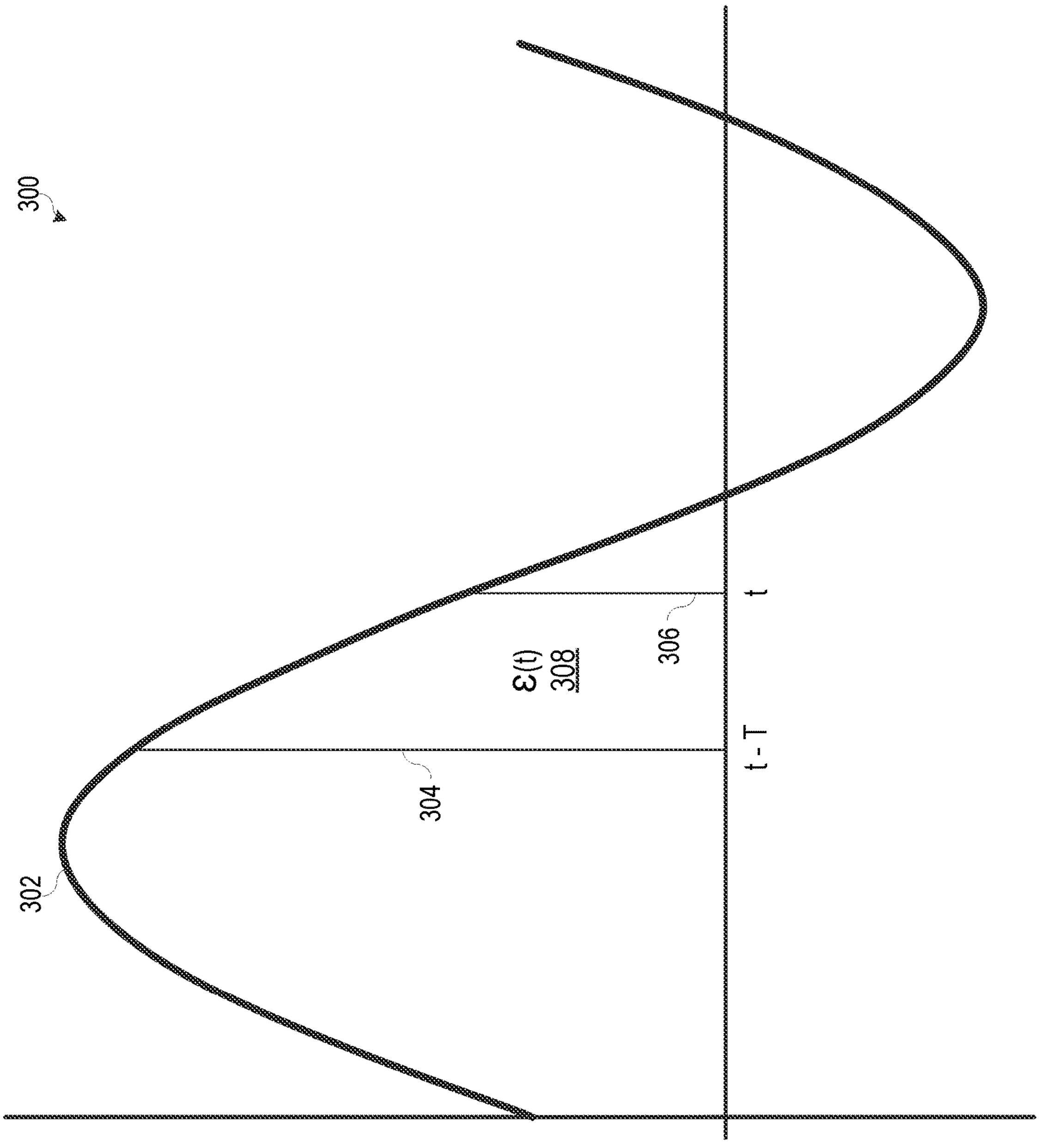
FIG. 3 illustrates a plot of power system energy information over time.

FIG. 3 illustrates a plot 300 of an instantaneous product of voltage and current 302 over time. An energy packet 308 is bounded at a time 304 and time 306. The positive energy packet 308 is calculated for the continuous-time case. The integration interval (Equation 1) covers from the present time and then back seconds to the previous time.

Figure 4:
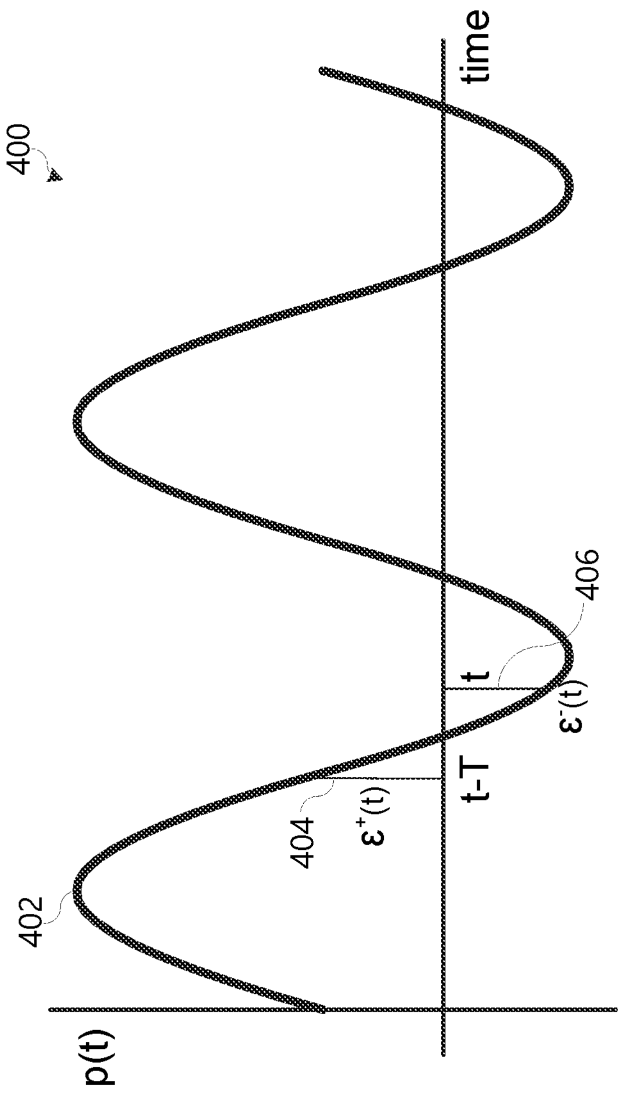
FIG. 4 illustrates a plot of power system energy information over time.

FIG. 4 illustrates a plot 400 of an instantaneous product of voltage and current 402 over time, where the integration interval from 404 (at time t−T) to 406 (at time t) includes power flowing in both directions. In this case two separate intervals are computed, one for energy flowing in the positive direction $\varepsilon^+$ and one for energy flowing in the opposite, or, negative, direction, $\varepsilon^-$. This algorithm easily extends to an arbitrary number of zero crossings over the integration interval. In various embodiments, the total of all power flowing in the positive direction may be combined for energy packet $\varepsilon^+$ and the total of all power flowing in the negative direction may be combined for energy packet $\varepsilon^-$. Both packets may be reported for the same time instant t and for the same interval t−T.

The separation into positive and negative regions is given mathematically as follows in Equations 4 and 5, for the discrete-time case:

$$\varepsilon_a^+[n] = T_s \sum_{m=M(n-1)+1}^{Mn} \begin{cases} v[m]i[m]; & v[m]i[m] > 0 \\ 0; & \text{otherwise} \end{cases} \quad \text{Eq. 4}$$

$$\varepsilon_a^-[n] = T_s \sum_{m=M(n-1)+1}^{Mn} \begin{cases} v[m]i[m]; & v[m]i[m] < 0 \\ 0; & \text{otherwise} \end{cases} \quad \text{Eq. 5}$$

Figure 5:
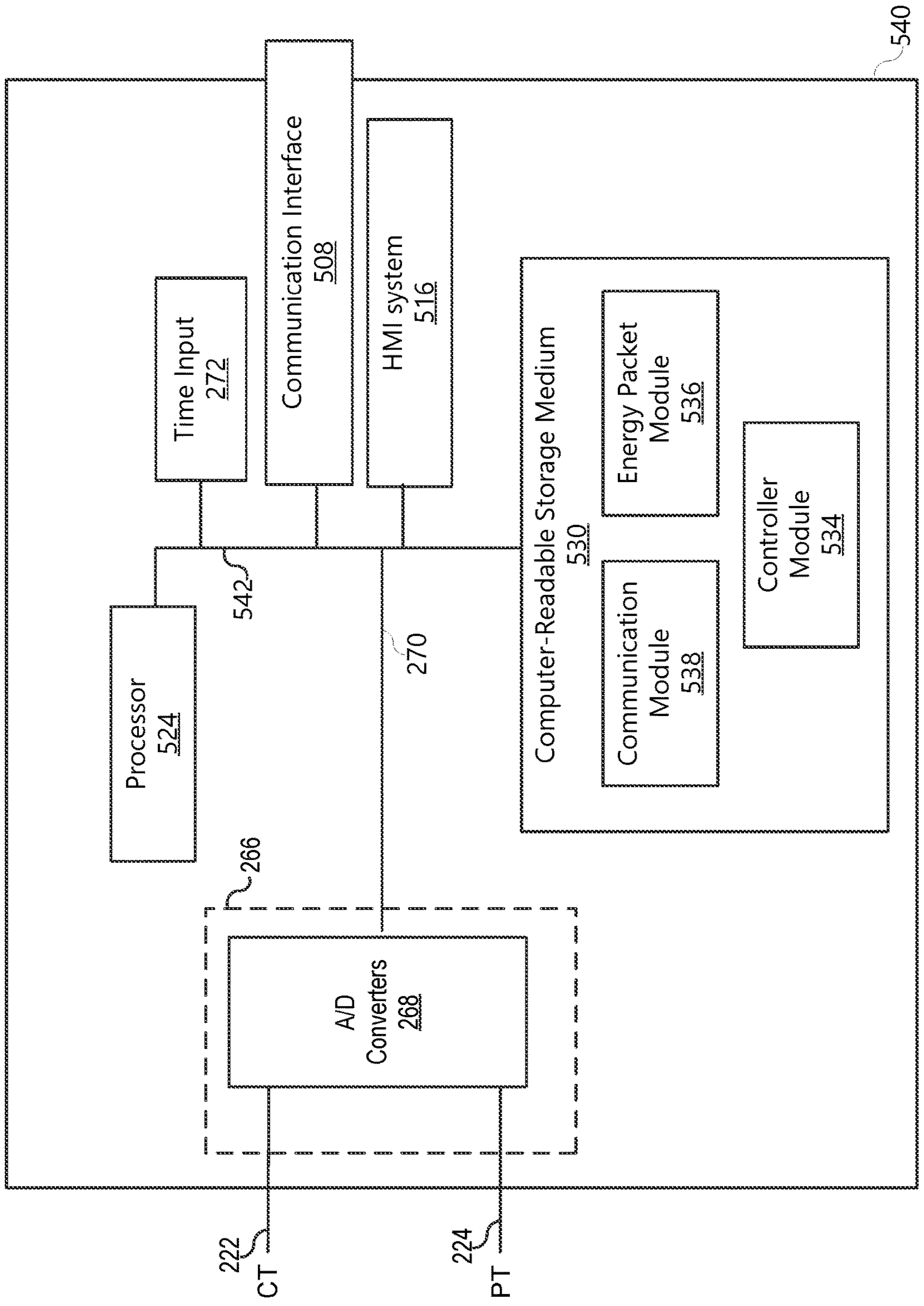
FIG. 5 illustrates a simplified block diagram of a device for electric power system monitoring, control, and/or protection using a first and second stream of packets in accordance with several embodiments herein.
Figure 6:
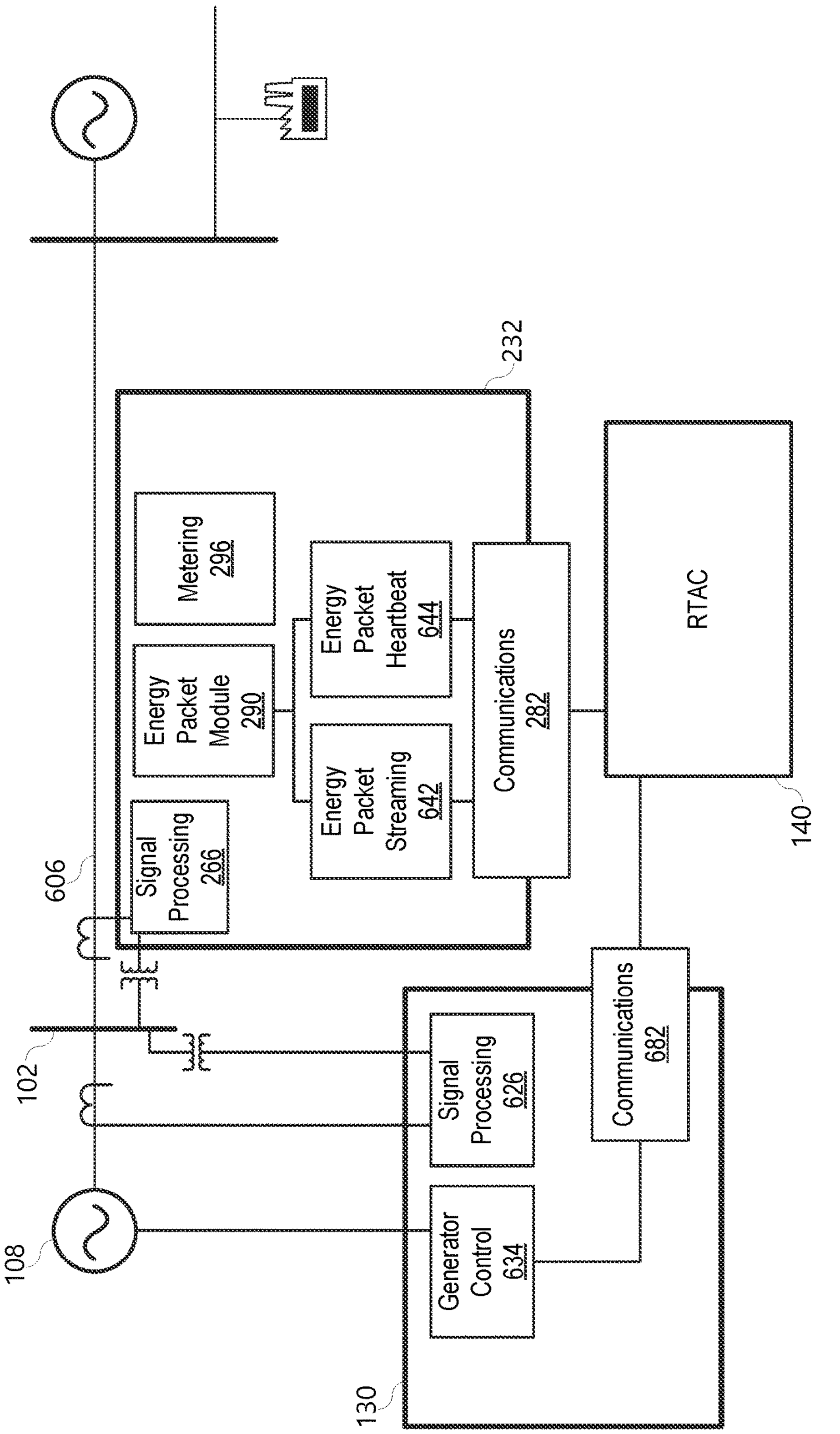
FIG. 6 illustrates a simplified block diagram of an electric power delivery system and associated devices for monitoring, control, and/or protection using a first and second stream of packets in accordance with several embodiments herein.

For illustration, it is convenient to show continuous-time waveforms as in FIGS. 5 and 6. However, the energy packets are typically implemented (calculated and used) with the discrete-time approach as shown in Equations 4 and 5. Energy packets for multiple phases, such as three phases, may be calculated as a summation of Equation 4 over all three phases and a separate summation of Equation 5 over all three phases. The three-phase energy packet calculation is a summation of the energy for each phase as shown in Equation 6:

$$\varepsilon[n] = \varepsilon_a[n] + \varepsilon_b[n] + \varepsilon_c[n] \quad \text{Eq. 6}$$

As can be seen, energy packets may be calculated at predetermined time interval lengths. For example, when a time interval length t−T of 1 millisecond, 1,000 energy packets are calculated each second. The energy packet module 290 may be configured to provide the energy packets at a first resolution to the communication module 294 for transmission at a first rate commensurate with the first resolution to consuming devices. For example, the energy packets at the resolution of 1,000 per second may be streamed from the IED 232 to a consuming device at a rate of 1,000 messages per second.

Various monitoring, control, and protection applications used by the consuming devices may use energy packets at this rate. It has been observed that various monitoring, control, and protection applications may be more responsive using energy packets streamed at a high rate such as 1,000 per second, than they would be using traditional power system measurements such as currents or voltages. Certain applications using traditional methods require power system measurements that must be calculated over one or more power system cycles. Accordingly, the operations using traditional measurements must necessarily lag the measurements by at least one power system cycle (1/50 seconds or 1/60 seconds of lag, depending on the power system frequency). Using energy packets, however, such operations would only lag the measurements by the time interval of the energy packet such as, for example, 1/1000 seconds.

According to various embodiments herein, the IED 232 may be configured to stream energy packets at a first resolution corresponding to the energy packet time interval length to consuming devices. Such communications may be made via a communications interface (such as network communication interface 282), and may be made peer-to-peer with the consuming device, over a communications network, or the like. Occasionally, communication of streaming data may drop a packet, resulting in a zero value for the dropped packet at the consuming device. The zero value may affect the monitoring, control, and/or protection operations of the consuming device. Depending on the operation, the zero-value may result in a misoperation, delayed operation, incorrect billing, or the like.

To correct for dropped packets (which may have a placeholder value of zero) a second lower-resolution stream of energy packets may also be determined by the IED 232 (using, for example, the energy packet module 290) and communicated to the consuming device. The second stream may have a resolution that is lower than the resolution of the first stream. The resolution of the second stream may be an integer quotient of the resolution of the first stream, where each packet of the second stream may be a sum of the energy packets of the first stream during the time interval of the second stream. The first stream may have a message rate at least several times the message rate of the second stream. In various examples, the second stream may be termed a "heartbeat".

The lower message rate of the second stream may allow for communication with features that increase security of the communication. The second stream may be communicated in accordance with a protocol that allows for receipt acknowledgements, repeated message transmissions, and the like. Further, the second stream may be communicated at a predictable rate such that the receiving device may determine a missing packet of the second stream using a time between message receipts. The receiving device may be configured to request retransmission of a missing packet of the second stream.

Because the second stream includes packets that are each a sum of the packets of the first stream during the time interval of the second stream, a consuming device may use the second stream to verify receipt of each of the packets of the first stream. Further, the consuming device may use the second stream to calculate a value of a missing packet of the first stream. With the corrected value, the consuming device may be able to correct or remediate for monitoring, control, and/or protection operations made using the first stream.

If the first stream has a message rate of 1,000 messages per second (mps), the second stream may have a message rate of 200 messages per second, 100 messages per second, or another integer quotient of the first stream message rate. Each packet of the second stream will be an accumulation (sum) of the values from the first stream. Table 1 includes values of a first stream of packets and a second stream of packets. The first stream sends energy packets at 1 ms intervals, and the second stream sends packets at 5 ms intervals, each of which is a sum of the energy packets of the first stream during the preceding 5 ms.

TABLE 1

| Timestamp (s) | First Stream: Phase A Positive Energy Packets at 1000 mps (millijoules) | Second Stream: Phase A Sum of Energy Packets at 200 mps (millijoules) |
|---|---|---|
| 0.001 | 3327 | |
| 0.002 | 1608 | |
| 0.003 | 254 | |
| 0.004 | 0 | |
| 0.005 | 983 | 6172 |
| 0.006 | 2670 | |
| 0.007 | 4147 | |
| 0.008 | 0 | |
| 0.009 | 3816 | |
| 0.010 | 2187 | 17434 |

As can be seen from the table, the packet from the first stream at time 0.004 s has a zero value. The second stream sends a value of 6172 mJ at time 0.005 s. A consuming device may use the second stream to determine whether the zero value at time 0.004 s was a dropped packet or a legitimate value. Using the second stream packet at time 0.005 s, the consuming device may determine a missing packet by comparing a sum of the packets from the first stream over the first five packets (time 0-0.005 s) against the packet from the second stream at time 0.005 s. It can be seen that since 3,327+1,608+254+0+983=6,172 mJ, and the packet from the second stream at 0.005 s is 6,172, the consuming device may determine that the value at 0.004 s was not a dropped packet.

The consuming device may similarly determine that a value for the packet from the first stream at 0.008 s was dropped. The sum of the packets from the first stream over the time period 0.006–0.010 s is 12,820 mJ, whereas the packet from the second stream at 0.010 s is 17,434 mJ. The consuming device may further determine that the value of the packet from the first stream at time 0.008 s is 17,434–12,820=4,164 mJ. The consuming device may further be configured to use the new value of the packet from the first stream to modify, correct, or remediate for monitoring, control, and/or protection operations that were determined using the previous (zero) value for the packet at time 0.008 s.

Note that the above example uses single-phase energy packets in both streams. The embodiments herein may be used for both positive and negative energy packets and for all phases and channels that are monitored by various IEDs of the electric power delivery system. Indeed, multiple-phase energy packets (both positive and negative) may be calculated and transmitted on the same data stream.

FIG. 5 illustrates a simplified functional block diagram of an IED 540 implemented as a consuming device in accordance with several embodiments herein. Indeed, the IED 540 may be configured to provide monitoring, control, and/or protection operations using the streams of data from a meter, merging unit, or other IED that provides such streams. In some embodiments, IED 540 may include a signal input 266 for receiving power system signals and converting the signals into digitized analog signals for further processing. However, in several embodiments IED 540 may not include a signal input. For example, IED 540 may be implemented as an RTAC or other controller that operates using signals or other values received from other devices over a communication link. Also similar to the IED 232, the IED 540 may include a time input 272; a communication interface 508; an HMI system 516; and a processor 524 capable of executing computer instructions stored on a computer-readable storage medium 530.

The IED 540 may include computer instructions stored on the computer-readable storage medium for performing a variety of power system monitoring, control, and/or protection operations. To this end, the computer-readable storage medium may include a controller module 534 of computer instructions for determining operations using information obtained. The controller module 534 may receive energy packets from the energy packet module 536.

The energy packet module 536 may be configured to receive the packet information from a first stream and as second stream of packets such as the first stream and the second stream transmitted by IED 232. The energy packet module 536 may be configured to provide the first stream of energy packets to the controller module 534. Further, the energy packet module 536 may be configured to determine a missing packet in the first stream using the packets from the second stream, as has been discussed above. If a missing packet is determined, the energy packet module 536 may be configured to determine a value of the missing packet as discussed herein. The value of the missing packet may be communicated to the controller module 534. The controller module 534 may use the value of the missing packet to modify an operation, correct for an operation, or remediate for an operation that was determined based on a stream of packets that included the missing packet.

The IED 540 may further include a communication module 538 for receiving communications and formatting the communications for use by the other modules; and for forming communications for other devices based on the outputs of the other modules. The communication module 538 may be used to transmit communications to other devices via the communication interface 508. For example, if a monitoring, control, or protection operation is determined by the controller module 534, the communication module 538 may be configured to have the operation transmitted via the communication interface 508 to a receiving device to effect the operation on the equipment of the power system. For example, a protection operation may include signaling a circuit breaker to open (trip). The communication module may cause a command to trip to be sent to the appropriate IED via the communication interface 508. The receiving IED may then command the circuit breaker to trip using its monitored equipment interface. In various embodiments, the IED 540 may include a monitored equipment interface for directly transmitting the command (such as a trip command) to the circuit breaker.

FIG. 6 illustrates a simplified one-line diagram of a power system and simplified functional block diagrams of a system for providing monitoring, control, and/or protection of the power system. In this illustrated embodiment, a generator 108 provides electric power via a bus 102 and line 606 to consuming devices. The generator 108 may be monitored and protected using a generator protection IED 130. As has been described above, the generator protection IED 130 may include signal processing 626 to obtain electric power signals such as current and voltage related to the generator, as well as other operational signals from the generator such as prime move frequency, temperature, and the like. The generator protection IED may include a generator control and protection module 634 for determining a status of the generator, and providing control and protection signals to the generator. For example, the generator control module 634 may signal the generator to transition between synchronous and asynchronous modes during startup. The generator control module 634 may provide a fuel reference to the prime mover to increase or decrease power output of the prime mover. The generator control module 634 may determine an electrical event such as rotor and/or stator faults and signal to trip the generator to isolate the generator from the power system.

The system may further include an IED 232 which may be implemented as a meter for metering power transmitted from the bus 102 to the remainder of the power system. The IED 232 may be configured as discussed above to provide a first stream of packets 642 and a second stream of packets 644 (which may be a heartbeat). The IED 232 may be configured to transmit the first stream and the second stream to controller 140.

In various embodiments, the controller 140 may receive the first stream of packets and the second stream of packets, and use the two streams to provide control, monitoring, and/or protection applications to the power system. In the illustrated embodiment, the controller 140 is configured to use the first stream and the second stream to determine a control operation of the generator 108. The controller may be configured to determine a real-time demand on the system, and provide a commensurate reference to the generator to react to the real-time demand. As mentioned above, use of the first stream of energy packets may allow for a much faster response to changes on the power demand of the power system than by using frequency-based measurements. In particular, the controller 140 may determine a power demand of the system using the first stream of energy packets received at around 1,000 packets per second. The controller 140 may determine a control signal to adjust power input to the generator (for example, a fuel reference to a prime mover of the generator) and transmit the control signal to the generator via the generator IED 130.

As discussed above, the controller 140 may determine a missing packet from the first stream using the packets from the second stream. Upon determination of a missing packet, the controller 140 may determine a value for the missing packet using a packet from the second stream. The controller 140 may then modify, correct, or remediate the control signal based on the determined value of the missing packet.

For example, the controller may determine a decrease in power demand of the power system due to a missing packet (zero-value) from the first stream, and calculate a control output for decreasing power output of a prime mover. The controller may be configured to wait until receipt of the next packet from the second stream, and verify that a packet was not dropped from the first stream before communicating the control operation to the generator via IED 130. If a missing packet is determined, then the controller may modify the control operation before transmitting it to the generator via IED 130.

Alternatively, the controller 140 may communicate the control operation to the generator via IED 130 immediately after determining the control operation. Upon receipt of the next packet from the second stream, the controller 140 may verify that a packet was not dropped from the first stream. However, if a dropped packet was determined, the controller 140 may determine a new control operation based on the value of the dropped packet, and immediately communicate the new control operation to the generator via IED 130 to remediate for the previous control operation.

The second stream may be slower (lower resolution) than the first stream, as has been discussed above. However, even at a lower speed and resolution, the second stream may be faster than using frequency-based measurements to determine control operations for the power system.

The above is an example of one use of the first stream and the second stream to provide a power output control operation to a generator; and correct, modify, or remedy for the control operation using the second stream. However, various other control, protection and monitoring operations may use the first and second streams to determine missing packets in the first stream, determine a value for the missing packet, and correct, modify, or remedy for the control operation determined from the stream with a missing packet.

Various embodiments may include additional streams beyond the first and second stream. A third stream may comprise packets at a resolution lower than that of the second stream. The third stream may include packets that are a sum of the packets of the second stream during the time interval of the third stream. The third stream may be used to determine a missing packet from the second stream.

In various embodiments, the second (lower-resolution) stream may be a running sum of the packets in the first stream. A missing packet from the first stream may be determined by comparing a sum of the packets of the first stream against a difference between the present and previous values of the second stream. In such embodiments, the second stream may be reset to zero at predictable intervals, such as, for example, each second.

In some embodiments, the packets of the second stream may be calculated by simply summing the values of the packets on the first stream. In other embodiments, the packets of the second stream may be calculated as a sum of the product of voltage and current samples over a time period (see, e.g. Equation 3), where the time period of the packets of the second stream is a product of an integer factor and the time period of the packets of the first stream.

Although several embodiments herein include descriptions of packets as energy packets, any cumulative power system quantity may be used as the packets in the first and second streams.

The examples and illustrations provided relate to specific embodiments and implementations of a few of the many possible variations. It is understood that the disclosure is not limited to the precise configurations and components disclosed herein. Accordingly, many changes may be made to the details of the above-described embodiments without departing from the underlying principles of this disclosure. The scope of the present invention should, therefore, be determined in the context of the possible claims that are supportable by this disclosure, including the following:

What is claimed:

1. A method to control an electric power delivery apparatus, comprising:

obtaining electrical signals from the electric power delivery apparatus using a data acquisition subsystem;

calculating electrical attributes of the electric power delivery apparatus using the electrical signals;

transmitting a first stream of packets of electrical attributes at a first resolution;

transmitting a second stream of packets of electrical attributes at a second resolution, wherein the second resolution is lower than the first resolution;

receiving the first stream of packets of electrical attributes by a control device;

determining a control action of the electric power delivery apparatus using the first stream of packets of electrical attributes;

affecting the control action for the electric power delivery apparatus;

receiving the second stream of packets of electrical attributes by the control device;

determining a missing packet from the first stream of electrical attributes using the second stream of packets of electrical attributes;

upon determination of the missing packet, determine a contingency control action for the electric power delivery apparatus; and affecting the contingency control action for the electric power delivery apparatus.

2. The method of claim 1, wherein:

the electric power delivery apparatus comprises an electric power generator;

the control action comprises changing an input to a prime mover of the generator; and the contingency control action comprise an additional change to the input to the prime mover of the generator.

3. The method of claim 2, wherein the input to the prime mover comprises a fuel valve reference.

4. The method of claim 1, wherein:

the first stream of packets of electrical attributes comprises energy packets calculated using a first data sample period; and the second stream of packets of electrical attributes comprises energy packets calculated using a second data sample period;

wherein the second data sample period is longer than the first data sample period.

5. The method of claim 1, further comprising calculating a value for the missing packet using the second stream of packets of electrical attributes and the first stream of packets of electrical attributes.

6. The method of claim 5, wherein the contingency control action comprises no action when the value for the missing packet is less than a predetermined threshold.

7. The method of claim 1, wherein the second stream of packets of electrical attributes comprises a summation of the first stream of packets of electrical attributes over a predetermined period of time.

8. The method of claim 7, wherein the predetermined period of time comprises the time between transmission of each packet of the second stream of packets of electrical attributes.

9. The method of claim 7, wherein the predetermined period of time is user-defined.

10. The method of claim 1, wherein the electrical attributes comprise energy packets.

11. The method of claim 10, wherein each energy packet of the energy packets comprises a summation of energy transmitted over a predetermined time period.

12. The method of claim 10, wherein:

the electrical signals comprise voltage and current; and, calculating the electrical attribute comprises calculating the energy packets as a sum of the products of voltage and current over a predetermined data sample period.

13. The method of claim 1, further comprising:

transmitting a third stream of packets of electrical attributes transmitted at a third resolution, wherein the third resolution is lower than the second resolution; and determining the contingency control action using the third stream of packets.

* * * * *